US008862927B2

(12) United States Patent
Bhalerao et al.

(10) Patent No.: US 8,862,927 B2
(45) Date of Patent: Oct. 14, 2014

(54) SYSTEMS AND METHODS FOR FAULT RECOVERY IN MULTI-TIER APPLICATIONS

(75) Inventors: Anand Bhalerao, Maharashtra (IN); Venkeepuram Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 325 days.

(21) Appl. No.: 13/238,505

(22) Filed: Sep. 21, 2011

(65) Prior Publication Data
US 2013/0042139 A1    Feb. 14, 2013

(30) Foreign Application Priority Data
Aug. 9, 2011    (IN) .............................. 1048/KOL/2011

(51) Int. Cl.
*G06F 11/07*    (2006.01)
*G06F 11/30*    (2006.01)

(52) U.S. Cl.
CPC ........ *G06F 11/0709* (2013.01); *G06F 11/0793* (2013.01); *G06F 11/3051* (2013.01); *G06F 11/3006* (2013.01)
USPC ........................................ 714/4.11; 714/6.3

(58) Field of Classification Search
CPC .......................... G06F 11/0793; G06F 11/2023
USPC .................................................. 714/4.11, 6.3
See application file for complete search history.

(56) References Cited

U.S. PATENT DOCUMENTS

| | | | |
|---|---|---|---|
| 7,213,246 B1 * | 5/2007 | van Rietschote et al. ......... 718/1 |
| 7,464,378 B1 * | 12/2008 | Limaye et al. ................ 718/100 |
| 2006/0085695 A1 * | 4/2006 | Shrivastava et al. ............ 714/47 |
| 2008/0244253 A1 * | 10/2008 | Corrao et al. ..................... 713/2 |
| 2008/0250267 A1 * | 10/2008 | Brown et al. ...................... 714/4 |
| 2008/0263390 A1 * | 10/2008 | Baba et al. ........................ 714/4 |
| 2008/0270515 A1 * | 10/2008 | Chen et al. ..................... 709/202 |
| 2009/0106748 A1 * | 4/2009 | Chess et al. ................... 717/168 |
| 2010/0153769 A1 * | 6/2010 | Santos et al. ...................... 714/2 |
| 2010/0250750 A1 * | 9/2010 | Massa et al. .................. 709/226 |

(Continued)

OTHER PUBLICATIONS

Microsoft; Achieve High Availability and Scalability Using ARR and NLB; http://technet.microsoft.com/en-us/library/ee683895(WS.10).aspx; Nov. 5, 2009.

(Continued)

*Primary Examiner* — Chae Ko
(74) *Attorney, Agent, or Firm* — ALG Intellectual Property, LLC

(57) ABSTRACT

A computer-implemented method for fault recovery in multi-tier applications may include: 1) identifying a plurality of clusters, 2) identifying a multi-tier application that includes a plurality of components, each cluster within the plurality of clusters hosting a component, 3) identifying a fault of a first component within the plurality of components on a first cluster within the plurality of clusters, the fault requiring a first recovery action, 4) identifying at least one dependency relationship involving the first component and a second component within the plurality of components on a second cluster within the plurality of clusters, 5) determining, based on the fault and the dependency relationship, that the second component requires a second recovery action to ensure that the multi-tier application operates correctly, and 6) performing the second recovery action on the second component. Various other methods, systems, and computer-readable media are also disclosed.

20 Claims, 7 Drawing Sheets

(56) References Cited

U.S. PATENT DOCUMENTS

2010/0293147 A1* 11/2010 Snow et al. .................. 707/640
2011/0087874 A1* 4/2011 Timashev et al. ............ 713/100
2011/0201327 A1* 8/2011 Kaul ............................ 455/425
2012/0011254 A1* 1/2012 Jamjoom et al. ............ 709/226
2012/0047394 A1* 2/2012 Jain et al. .................... 714/4.11
2012/0131567 A1* 5/2012 Barros et al. ................ 717/170
2012/0151061 A1* 6/2012 Bartfai-Walcott et al. ... 709/226
2012/0180044 A1* 7/2012 Donnellan et al. ................ 718/1

OTHER PUBLICATIONS

Linuxine; Efficient High-Available LoadBalanced Cluster On CentOS 5.3 (Direct Routing Method); http://www.linuxine.com/story/efficient-high-available-loadbalanced-cluster-centos-53-direct-routing-method; Feb. 15, 2010.

* cited by examiner

SYSTEMS AND METHODS FOR FAULT RECOVERY IN MULTI-TIER APPLICATIONS

BACKGROUND

Multi-tier applications include independently executable components which, in combination, may provide a service. Organizations may use multi-tier applications for increased flexibility, scalability, security, and/or availability, since an organization may separately configure the execution environment of each component. For example, an organization may execute each component of a multi-tier application on a separate cluster and provision each cluster according to the requirements of the corresponding component of the multi-tier application. In some examples, the organization may wish to provide high availability for the multi-tier application. In these examples, the organization may configure each cluster to provide high availability for its corresponding component.

Unfortunately, high availability for each component of a multi-tier application may not automatically translate into high availability for the multi-tier application. Because the components of a multi-tier application may be logically interdependent, a fault within one component may interfere with the correct operation of another component. Accordingly, the instant disclosure identifies a need for additional and improved systems and methods for fault recovery in multi-tier applications.

SUMMARY

As will be described in greater detail below, the instant disclosure generally relates to systems and methods for fault recovery in multi-tier applications. Systems and methods described herein may provide high availability to multi-tier applications by identifying dependencies between components of multi-tier applications and performing recovery actions on any components that depend on other components that experience a fault.

For example, a method may include identifying a plurality of clusters. The method may also include identifying a multi-tier application that includes a plurality of components. As will be explained in greater detail below, each cluster within the plurality of clusters may host a component within the plurality of components. The method may also include identifying a fault of a first component within the plurality of components on a first cluster within the plurality of clusters. As will be explained in greater detail below, the fault may require a first recovery action to ensure that the multi-tier application operates correctly. The method may also include identifying at least one dependency relationship involving the first component and a second component within the plurality of components on a second cluster within the plurality of clusters. The method may additionally include determining, based on the fault and the dependency relationship, that the second component requires a second recovery action to ensure that the multi-tier application operates correctly. The method may also include performing the second recovery action on the second component.

In another example, a system may include one or more processors configured to execute an identification module, a monitoring module, a dependency module, and a recovery module. The identification module may be programmed to identify a plurality of clusters and to identify a multi-tier application including a plurality of components. Each cluster within the plurality of clusters may host a component within the plurality of components. The monitoring module may be programmed to identify a fault of a first component within the plurality of components on a first cluster within the plurality of clusters. The fault may require a first recovery action to ensure that the multi-tier application operates correctly. The dependency module may be programmed to identify at least one dependency relationship involving the first component and a second component within the plurality of components on a second cluster within the plurality of clusters. The dependency module may additionally be programmed to determine, based on the fault and the dependency relationship, that the second component requires a second recovery action to ensure that the multi-tier application operates correctly. The recovery module may be programmed to perform the second recovery action on the second component.

The plurality of clusters may be configured in a variety of ways. In some examples, each cluster within the plurality of clusters may include a high-availability cluster. Additionally or alternatively, the plurality of clusters may include a plurality of heterogeneous clustering platforms. In some examples, each cluster within the plurality of clusters may include a cross-cluster availability agent for determining dependencies within the plurality of components.

The recovery actions may include any suitable action for ensuring the correct operation of the multi-tier application. For example, the first recovery action may include restarting the first component. Additionally or alternatively, the second recovery action may include restarting the second component. In some examples, the monitoring module may be programmed to identify the fault of the first component by receiving availability information from the first cluster.

In some examples, the dependency module may be programmed to, as part of determining that the second component requires the second recovery action, determine, based on the dependency relationship, an order in which to perform the first recovery action and the second recovery action. In these examples, the recovery module may be programmed to perform the first recovery action and the second recovery action in the determined order.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
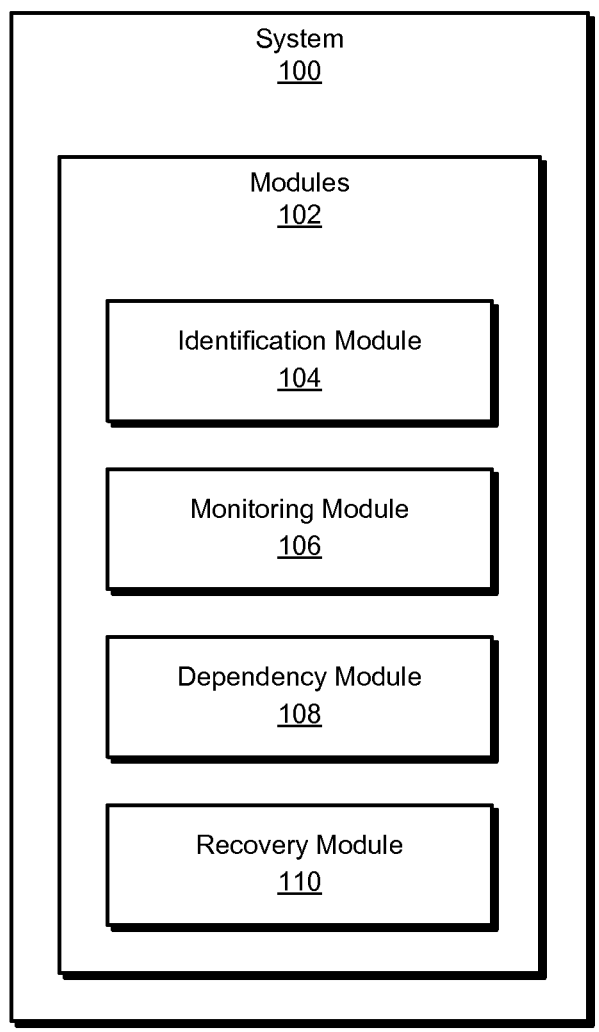
FIG. 1 is a block diagram of an exemplary system for fault recovery in multi-tier applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for fault recovery in multi-tier applications. Systems and methods described herein may provide high availability to multi-tier applications by identifying dependencies between components of multi-tier applications and performing recovery actions on any components that depend on other components that experience a fault. By maintaining inter-component dependency information, monitoring for faults across multi-tier applications, and performing recovery actions on affected components (such as restarting an affected component), these systems and methods may provide high availability across clusters for multi-tier applications.

Figure 2:
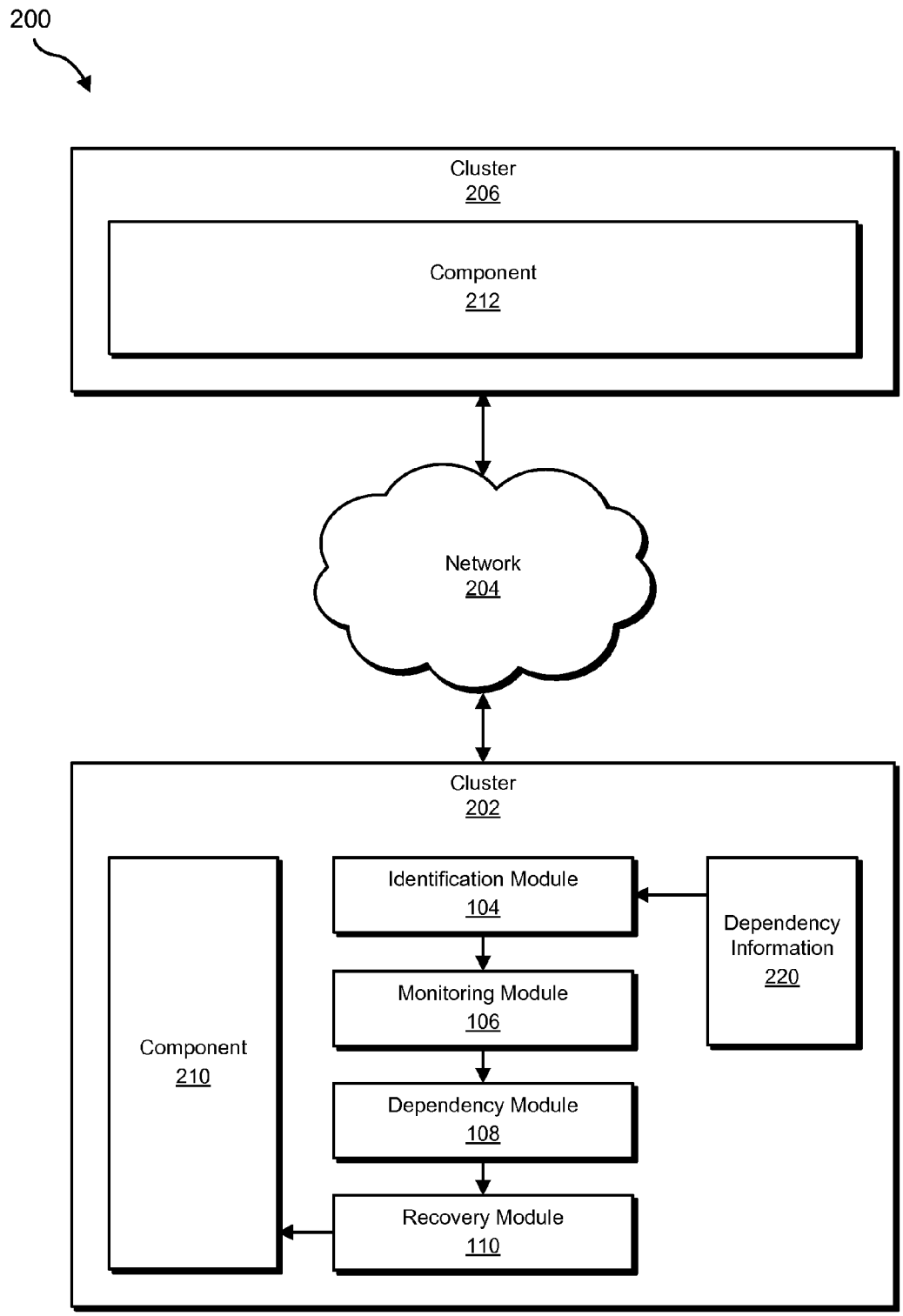
FIG. 2 is a block diagram of an exemplary system for fault recovery in multi-tier applications.
Figure 3:
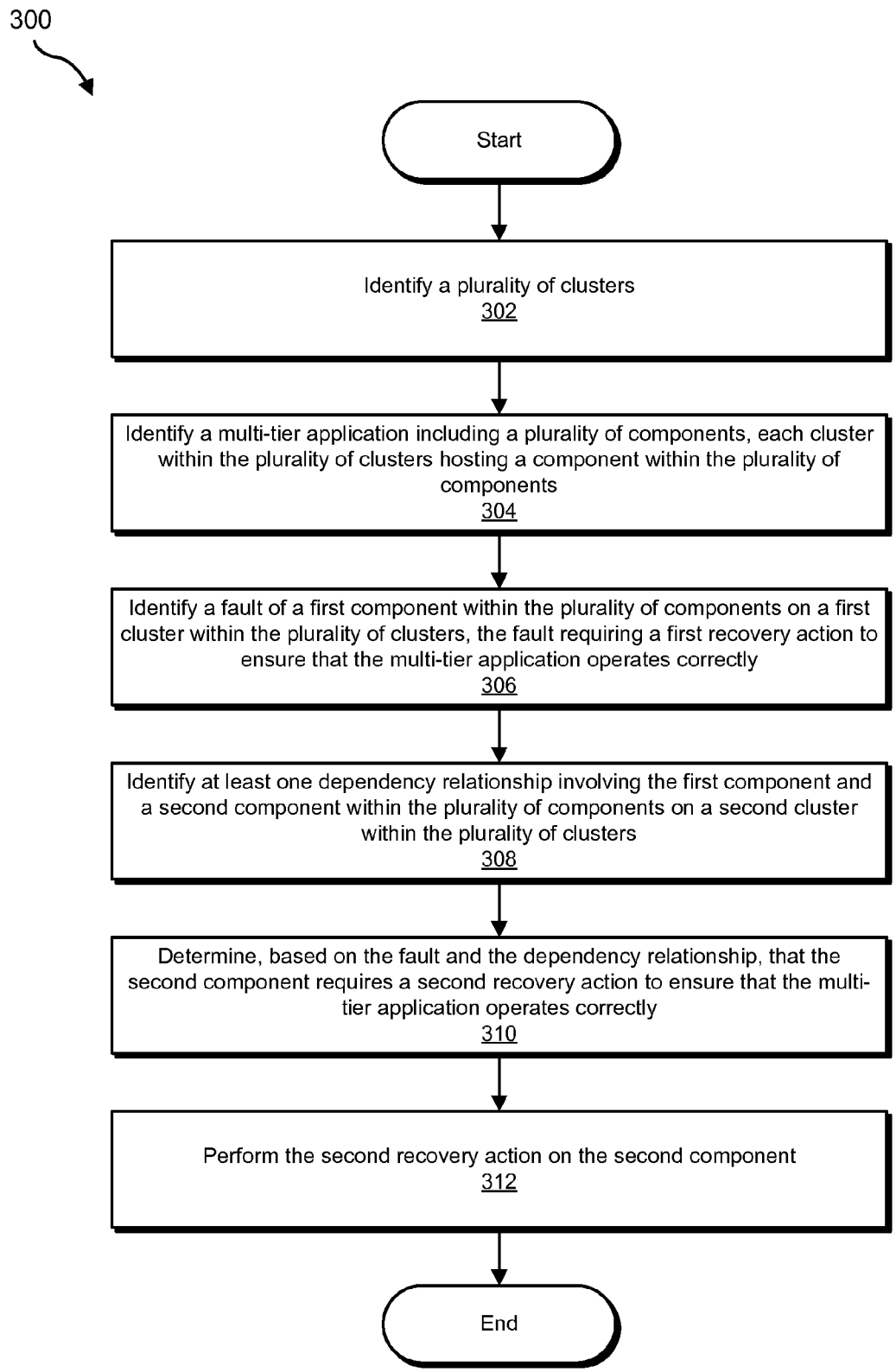
FIG. 3 is a flow diagram of an exemplary method for fault recovery in multi-tier applications.
Figure 4:
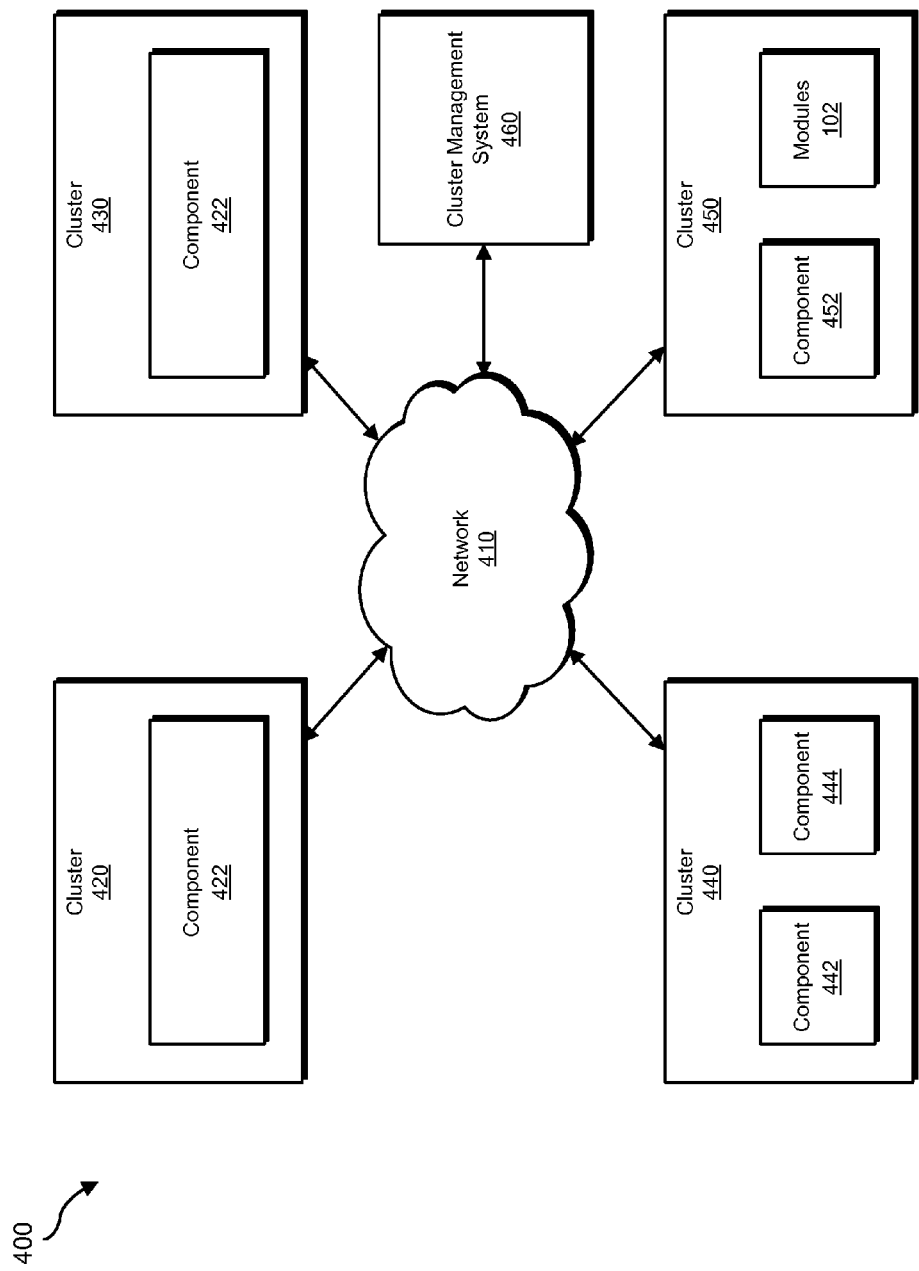
FIG. 4 is a block diagram of an exemplary system for fault recovery in multi-tier applications.

The following will provide, with reference to FIGS. 1, 2, and 4, detailed descriptions of exemplary systems for fault recovery in multi-tier applications. Detailed descriptions of corresponding computer-implemented methods will also be provided in connection with FIG. 3. Detailed descriptions of an exemplary multi-tier application, and dependencies between its components, will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for fault recovery in multi-tier applications. As illustrated in this figure, exemplary system 100 may include one or more modules 102 for performing one or more tasks. For example, and as will be explained in greater detail below, exemplary system 100 may include an identification module 104 programmed to identify a plurality of clusters and to identify a multi-tier application including a plurality of components. Each cluster within the plurality of clusters may host a component within the plurality of components. Exemplary system 100 may also include a monitoring module 106 programmed to identify a fault of a first component within the plurality of components on a first cluster within the plurality of clusters. The fault may require a first recovery action to ensure that the multi-tier application operates correctly.

In addition, and as will be described in greater detail below, exemplary system 100 may include a dependency module 108 programmed to identify at least one dependency relationship involving the first component and a second component within the plurality of components on a second cluster within the plurality of clusters. Dependency module 108 may additionally be programmed to determine, based on the fault and the dependency relationship, that the second component requires a second recovery action to ensure that the multi-tier application operates correctly. Exemplary system 100 may also include a recovery module 110 programmed to perform the second recovery action on the second component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., cluster 202 and/or cluster 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a cluster 202 in communication with a cluster 206 via a network 204. Clusters 202 and 206 may coordinate to run a multi-tier application. In one embodiment, and as will be described in greater detail below, cluster 202 may include identification module 104, monitoring module 106, dependency module 108, and recovery module 110.

Identification module 104 may be programmed to identify cluster 202 and cluster 206. Identification module 104 may also be programmed to identify a multi-tier application including a component 210 on cluster 202 and a component 212 on cluster 206. Monitoring module 106 may be programmed to identify a fault of component 212 on cluster 206. The fault may require a first recovery action to ensure that the multi-tier application operates correctly. Dependency module 108 may be programmed to identify dependency information 220 indicating a dependency relationship between component 210 and component 212. Dependency module 108 may additionally be programmed to determine, based on the fault and dependency information 220, that component 210 requires a recovery action to ensure that the multi-tier application operates correctly. Recovery module 110 may be programmed to perform the recovery action on component 210.

Cluster 202 generally represents any group of computing devices capable of reading computer-executable instructions. Examples of computing devices within cluster 202 include, without limitation, servers, desktops, laptops, cellular phones, personal digital assistants (PDAs), multimedia players, embedded systems, combinations of one or more of the same, exemplary computing system 610 in FIG. 6, or any other suitable computing device. Computing devices within cluster 202 may work in concert to collectively execute component 210.

Cluster 206 generally represents any group of computing devices capable of reading computer-executable instructions. Examples of computing devices within cluster 206 include, without limitation, servers, desktops, laptops, cellular phones, personal digital assistants (PDAs), multimedia players, embedded systems, combinations of one or more of the same, exemplary computing system 610 in FIG. 6, or any other suitable computing device. Computing devices within cluster 206 may work in concert to collectively execute component 212.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between cluster 202 and cluster 206.

FIG. 3 is a flow diagram of an exemplary computer-implemented method 300 for fault recovery in multi-tier applications. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of clusters. For example, at step 302 identification module 104 may, as part of cluster 202 in FIG. 2, identify clusters 202 and 206.

As used herein, the term "cluster" generally refers to any group of interconnected computing systems configured to coordinate to provide one or more services and/or to share a computational workload. In some examples, each cluster within the plurality of clusters may include a high-availability cluster. As used herein, the phrase "high-availability cluster" may refer to any cluster configured to reduce and/or eliminate service disruptions through redundant availability of computing resources in the cluster. For example, a high-availability cluster may include two or more nodes. If one node fails, services provided by the failed node may be resumed by another node in the cluster.

In some examples, the plurality of clusters may include a plurality of heterogeneous clustering platforms. For example, one or more of the clusters within the plurality of clusters may be unable to natively communicate and/or coordinate clustering activities such as fail-over functionality, availability information, and/or dependency information relating to services and/or resources within each cluster. Examples of clustering platforms may include VERITAS CLUSTER SERVER, MICROSOFT CLUSTER SERVER, and VMWARE HIGH AVAILABILITY with SYMANTEC APPCONTROL. For example, one cluster within the plurality of clusters may use VERITAS CLUSTER SERVER for clustering, another cluster within the plurality of clusters may use MICROSOFT CLUSTER SERVER, and yet another cluster within the plurality of clusters may use VMWARE HIGH AVAILABILITY with SYMANTEC APPCONTROL.

One or more clusters within the plurality of clusters may include a cross-cluster availability agent. The cross-cluster availability agent may be configured to perform one or more of the steps described herein (e.g., with one or more of the modules described herein). For example, the cross-cluster availability agent may be configured to determine dependencies within the plurality of components. In some examples, the cross-cluster availability agent may be deployed on one cluster within the plurality of clusters (e.g., a "hub" cluster). In these examples, the cross-cluster availability agent may gather information regarding faults and/or dependencies from other clusters within the plurality of clusters (e.g., "spoke" clusters) and determine what dependencies are implicated across clusters. Additionally or alternatively, the cross-cluster availability agent may be deployed on each cluster within the plurality of clusters. In these examples, one cluster may act as a hub cluster while other clusters act as spoke clusters. Accordingly, if the cross-cluster availability agent fails on one cluster, the cross-cluster availability agent on another cluster may take over inter-cluster availability functionality. Additionally or alternatively, the cross-cluster availability agent may work in parallel across the plurality of clusters.

Identification module 104 may identify the plurality of clusters in any suitable manner. For example, identification module 104 may identify the plurality of clusters by reading from a configuration file that identifies the plurality of clusters (e.g., that identifies a network address and/or handle of each cluster in the plurality of clusters). Additionally or alternatively, identification module 104 may identify the plurality of clusters by identifying a multi-tier application executing on the plurality of clusters. In some examples, identification module 104 may identify the plurality of clusters by executing on one or more of the plurality of clusters.

FIG. 4 is a block diagram of an exemplary plurality of clusters 400. As illustrated in FIG. 4, plurality of clusters 400 may include a cluster 420, a cluster 430, a cluster 440, and a cluster 450 in communication over a network 410. Accordingly, at step 302 identification module 104 may identify plurality of clusters 400 by identifying clusters 420, 430, 440, and 450. As discussed earlier, in some examples one cluster may act as a hub cluster for managing inter-cluster availability of a multi-tier application. For example, cluster 450 may be configured with modules 102 to act as a hub cluster for plurality of clusters 400. A cluster management system 460 may also be in communication with clusters 420, 430, 440, and 450. Cluster management system 460 may enable an administrator to monitor and/or reconfigure activity within the cluster. In some examples, cluster mangagement system 460 may allow an administrator to define cross-cluster dependencies (e.g., to configure dependency information 220 in FIG. 2).

Returning to FIG. 3, at step 304 one or more of the systems described herein may identify a multi-tier application including a plurality of components, each cluster within the plurality of clusters hosting a component within the plurality of components. For example, at step 304 identification module 104 may, as part of cluster 202 in FIG. 2, identify a multi-tier application including component 210 on cluster 202 and component 212 on cluster 206. Using FIG. 4 as another example, at step 304 identification module 104 may, as part of cluster 450, identify a multi-tier application including a component 422 on clusters 420 and 430, a component 442 and a component 444 on cluster 440, and a component 452 on a cluster 450.

As used herein, the term "multi-tier application" generally refers to any application with independently executable components which, in combination, may provide a service. In some examples, each component of the multi-tier application may include a separate application. For example, a multi-tier application may include a database component (such as ORACLE REAL APPLICATION CLUSTERS), a business logic component (such one or more applications hosted on ORACLE WEBLOGIC and/or APACHE TOMCAT), and a presentation component (such as APACHE WEB SERVER). In this example, the presentation component may present a user interface for the multi-tier application. The presentation component may communicate with the business logic component to process service requests and the business logic component may communicate with the database component to store and/or retrieve data. In some examples, each component of the multi-tier application may include a service group that includes a program and/or application such as those described in the above example. As used herein, the term "service group" generally refers to a logical grouping of resources that may pertain to an application (e.g., which an application uses and/or relies upon).

In some examples, one or more components within the plurality of components may execute on different clusters within the plurality of clusters. Accordingly, a clustering platform may natively provide high availability to a component of the multi-tier application without providing high availability to the multi-tier application as a whole. As will be described in greater detail below, the systems and methods described herein may therefore identify dependencies between components to perform recovery actions and ensure high availability of the multi-tier application as a whole.

At step 306 one or more of the systems described herein may identify a fault of a first component within the plurality of components on a first cluster within the plurality of clusters, the fault requiring a first recovery action to ensure that the multi-tier application operates correctly. For example, at step 306 monitoring module 106 may, as part of cluster 202 in FIG. 2, identify a fault of component 212 on cluster 206. Using FIG. 4 as an additional example, at step 306 monitoring module 106 may, as part of cluster 450, identify a fault of component 452 on cluster 450.

The fault may include any of a variety of events and/or states. For example, the fault may include the component (or a sub-component of the component) crashing. Additionally or alternatively, the fault may include an error and/or warning produced by the component. Generally, the fault may include anything that may compromise the integrity of the multi-tier application and/or anything that could create a fault and/or error in another component.

As used herein, the phrase "recovery action" may refer to any action capable of correcting a fault and/or restoring the integrity of the multi-tier application. For example, a recovery action may include restarting a component (or a sub-component of the component), reconfiguring a component, and/or failing over a component to a different node within a cluster. For example, the first recovery action may include restarting the first component.

Monitoring module 106 may identify the fault in any of a variety of ways. For example, monitoring module 106 may receive availability information from the first cluster. In some examples, a clustering platform of the first cluster may provide high availability to the first component. The clustering platform of the first cluster may accordingly generate availability information (i.e., information relating to the operational status of the first component). In some examples, the first cluster may transmit the availability information to monitoring module 106. Additionally or alternatively, monitoring module 106 may retrieve the availability information from the first cluster. For example, monitoring module 106 may scan an error log on the first cluster to identify the fault. Additionally or alternatively, monitoring module 106 may probe the first component with an attempted communication and determine the fault based on the outcome of the attempted communication. In some examples, monitoring module 106 may identify the fault by receiving a message indicating that the first recovery action has been performed (e.g., that the component has been restarted). As mentioned earlier, in some examples, one cluster within the plurality of clusters may operate as a hub for high availability for the multi-tier application. In these examples, monitoring module 106 may operate on the hub cluster and receive availability information relating to the various components within plurality of components from each cluster in the plurality of clusters.

Returning to FIG. 3, at step 308 one or more of the systems described herein may identify at least one dependency relationship involving the first component and a second component within the plurality of components on a second cluster within the plurality of clusters. For example, at step 306 dependency module 108 may, as part of cluster 202 in FIG. 2, identify a dependency relationship involving component 212 and component 210 represented in dependency information 220. Using FIG. 4 as an additional example, at step 308 dependency module 108 may, as part of cluster 450, identify a dependency relationship between component 452 and component 442.

In some examples, the dependency relationship may define one or more operational constraint placed on the second component based on the fault of the first component and/or the first recovery action to be applied to the first component. Additionally or alternatively, the dependency relationship may define the order in which one or more components within the plurality of components may be stopped and/or started (e.g., the fault in the first component may require that the first component restart and then the second component restart).

Figure 5:
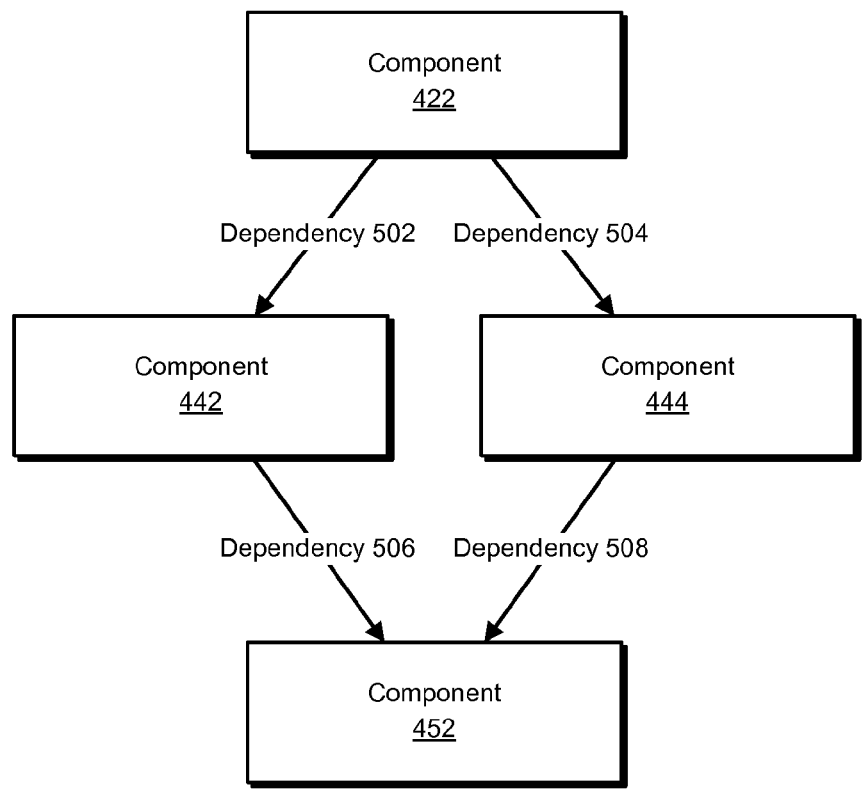
FIG. 5 is a block diagram of an exemplary multi-tier application.

FIG. 5 is a block diagram of an exemplary multi-tier application 500 illustrating dependencies between components of multi-tier application 500. As illustrated in FIG. 5, component 442 may depend on component 452 as defined by a dependency 506. Likewise, component 444 may depend on component 452 as defined by a dependency 508. Component 422 may depend on component 442 as defined by a dependency 502. Component 422 may also depend on component 444 as defined by a dependency 504. For example, component 452 may represent a database component. Components 442 and 444 may represent business logic components. Dependency 506 may represent a constraint for component 442 to restart if component 452 experiences a fault and restarts. Likewise, dependency 508 may represent a constraint for component 444 to restart if component 452 experiences a fault and restarts.

Returning to FIG. 3, at step 310 one or more of the systems described herein may determine, based on the fault and the dependency relationship, that the second component requires a second recovery action to ensure that the multi-tier application operates correctly. For example, at step 310 dependency module 108 may, as part of cluster 202 in FIG. 2, determine that component 210 requires a second recovery action to ensure that the multi-tier application operates correctly. Using FIG. 4 as an additional example, at step 310 dependency module 108 may, as part of cluster 450, determine that component 442 requires a recovery action to ensure that multi-tier application 500 operates correctly. For example, referring to FIG. 5, dependency module 108 may determine that component 442 requires the second recovery action based on the fault in component 452 and dependency 506 between component 442 and component 452.

The second recovery action may include any necessary recovery action, including any recovery action given as an example earlier. For example, the second recovery action may include restarting the second component. In some examples, dependency module 108 may also determine, based on the dependency relationship, an order in which to perform the first recovery action and the second recovery action. For example, dependency module 108 may determine to perform the first recovery action before the second recovery action. For example, dependency module 108 may determine to restart the first component before restarting the second component in order to provide correct initialization data from the first component to the second component.

At step 312 one or more of the systems described herein may perform the second recovery action on the second component. For example, at step 312 recovery module 110 may, as part of cluster 202 in FIG. 2, perform the second recovery action on component 210. Using FIG. 4 as an additional example, at step 312 recovery module 110 may, as part of cluster 450, perform the second recovery action on component 442.

Recovery module 110 may perform step 312 in any suitable manner. For example, recovery module 110 may transmit a message to the clustering platform of the second cluster to perform the second recovery action. In some examples, as described earlier, dependency module 108 may determine the order in which to perform the first and second recovery actions. In these examples, recovery module 110 may perform the first recovery action and the second recovery action in the determined order. After step 312, method 300 may terminate.

As an example of the above-described systems and methods, a multi-tier application may include a database component configured to provide database services and a business logic component (e.g., an application which relies on the database component). The systems described herein may identify a dependency between the business logic component and the database component. For example, the application may rely on initialization data from the database component. Accordingly, if the database component experiences a fault and must restart, the initialization data needed for the application to connect to the database may change. Therefore, the systems described herein may, upon recognizing that the dependency between the business logic component and the database component has been triggered (e.g., by identifying that the database component has crashed and/or restarted), restart the application in order to connect to the new instantiation of the database. Additionally or alternatively, these systems may reconfigure the application without restarting the application by providing the new initialization data from the new instantiation of the database to the application.

As detailed above, by maintaining inter-component dependency information, monitoring for faults across multi-tier applications, and performing recovery actions on affected components (such as restarting an affected component), these systems and methods may provide high availability across clusters for multi-tier applications.

Figure 6:
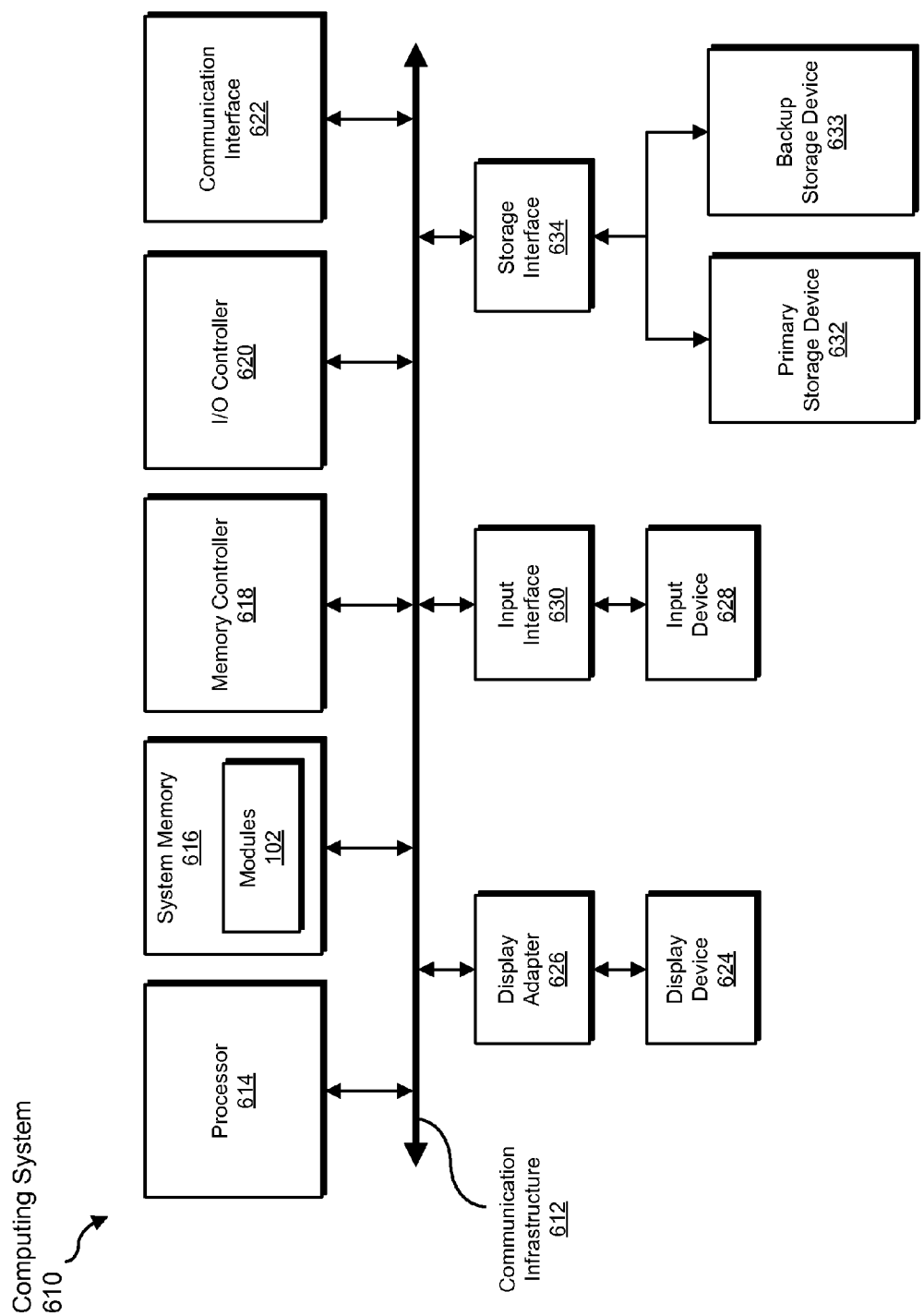
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, restarting, receiving, determining, and/or performing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, restarting, receiving, determining, and/or performing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, restarting, receiving, determining, and/or performing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, restarting, receiving, determining, and/or performing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, restarting, receiving, determining, and/or performing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, restarting, receiving, determining, and/or performing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
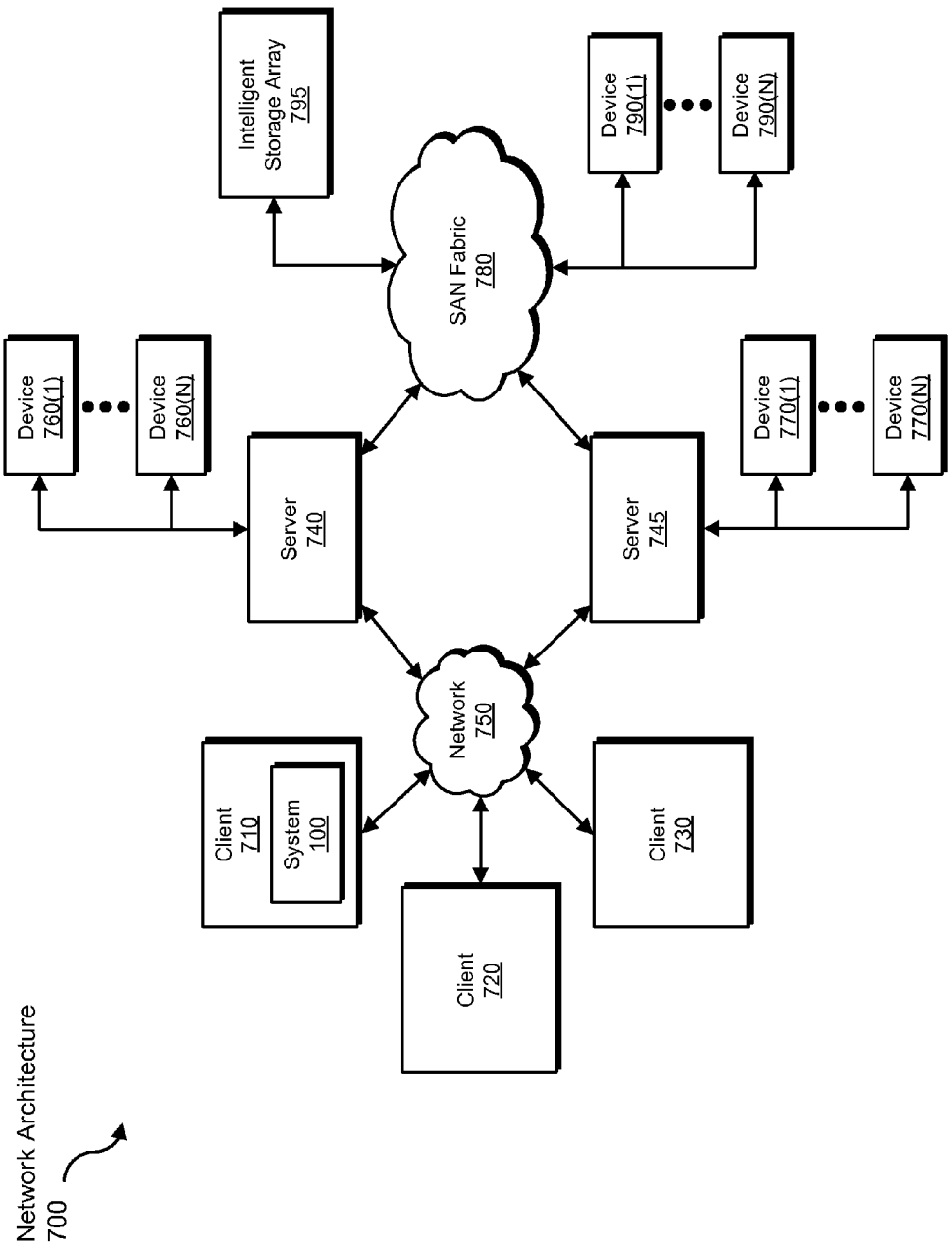
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, restarting, receiving, determining, and/or performing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for fault recovery in multi-tier applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a plurality of clusters into a system for high-availability of multi-tier applications.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for fault recovery in multi-tier applications, at least a portion of the method being performed by a computing device comprising at least one processor, the method comprising:
   identifying a plurality of clusters, wherein a first cluster and a second cluster within the plurality of clusters do not share availability information with each other;
   identifying a multi-tier application comprising a plurality of components, each cluster within the plurality of clusters hosting a component within the plurality of components;
   identifying a fault of a first component within the plurality of components on the first cluster within the plurality of clusters, the fault requiring a first recovery action to ensure that the multi-tier application operates correctly, wherein identifying the fault comprises probing the first component with an attempted communication and determining the fault based on the outcome of the attempted communication;
   identifying at least one dependency relationship involving the first component and a second component within the plurality of components on the second cluster within the plurality of clusters;
   determining, based on the fault and the dependency relationship, that the second component requires a second recovery action to ensure that the multi-tier application operates correctly;
   performing the second recovery action on the second component.

2. The computer-implemented method of claim 1, further comprising:
   determining, based on the dependency relationship, an order in which to perform the first recovery action and the second recovery action;
   performing the first recovery action and the second recovery action in the determined order.

3. The computer-implemented method of claim 1, wherein the first recovery action comprises restarting the first component.

4. The computer-implemented method of claim 1, wherein the second recovery action comprises restarting the second component.

5. The computer-implemented method of claim 1, wherein each cluster within the plurality of clusters comprises a high-availability cluster.

6. The computer-implemented method of claim 5, wherein identifying the fault comprises receiving availability information from the first cluster.

7. The computer-implemented method of claim 1, wherein the plurality of clusters comprises a plurality of heterogeneous clustering platforms.

8. The computer-implemented method of claim 1, wherein each cluster within the plurality of clusters comprises a cross-cluster availability agent for determining dependencies within the plurality of components.

9. A system for fault recovery in multi-tier applications, the system comprising:
   an identification module programmed to:
      identify a plurality of clusters, wherein a first cluster and a second cluster within the plurality of clusters do not share availability information with each other;
      identify a multi-tier application comprising a plurality of components, each cluster within the plurality of clusters hosting a component within the plurality of components;
   a monitoring module programmed to identify a fault of a first component within the plurality of components on the first cluster within the plurality of clusters, the fault requiring a first recovery action to ensure that the multi-tier application operates correctly, wherein identifying the fault comprises probing the first component with an attempted communication and determining the fault based on the outcome of the attempted communication;
   a dependency module programmed to:
      identify at least one dependency relationship involving the first component and a second component within the plurality of components on the second cluster within the plurality of clusters;
      determine, based on the fault and the dependency relationship, that the second component requires a second recovery action to ensure that the multi-tier application operates correctly;
   a recovery module programmed to perform the second recovery action on the second component;
   at least one processor configured to execute the identification module, the monitoring module, the dependency module, and the recovery module.

10. The system of claim 9, wherein:
   the dependency module is further programmed to determine, based on the dependency relationship, an order in which to perform the first recovery action and the second recovery action;
   the recovery module is further programmed to perform the first recovery action and the second recovery action in the determined order.

11. The system of claim 9, wherein the first recovery action comprises restarting the first component.

12. The system of claim 9, wherein the second recovery action comprises restarting the second component.

13. The system of claim 9, wherein each cluster within the plurality of clusters comprises a high-availability cluster.

14. The system of claim 13, wherein the monitoring module is programmed to identify the fault by receiving availability information from the first cluster.

15. The system of claim 9, wherein the plurality of clusters comprises a plurality of heterogeneous clustering platforms.

16. The system of claim 9, wherein each cluster within the plurality of clusters comprises a cross-cluster availability agent for determining dependencies within the plurality of components.

17. A computer-readable-storage medium comprising one or more computer-executable instructions that, when executed by at least one processor of a computing device, cause the computing device to:
   identify a plurality of clusters, wherein a first cluster and a second cluster within the plurality of clusters do not share availability information with each other;
   identify a multi-tier application comprising a plurality of components, each cluster within the plurality of clusters hosting a component within the plurality of components;
   identify a fault of a first component within the plurality of components on the first cluster within the plurality of clusters, the fault requiring a first recovery action to ensure that the multi-tier application operates correctly, wherein identifying the fault comprises probing the first component with an attempted communication and determining the fault based on the outcome of the attempted communication;

identify at least one dependency relationship involving the first component and a second component within the plurality of components on the second cluster within the plurality of clusters;

determine, based on the fault and the dependency relationship, that the second component requires a second recovery action to ensure that the multi-tier application operates correctly;

perform the second recovery action on the second component.

18. The computer-readable medium of claim 17, wherein the one or more computer-executable instructions further cause the computing device to:

determine, based on the dependency relationship, an order in which to perform the first recovery action and the second recovery action;

perform the first recovery action and the second recovery action in the determined order.

19. The computer-readable medium of claim 17, wherein the first recovery action comprises restarting the first component.

20. The computer-readable medium of claim 17, wherein the second recovery action comprises restarting the second component.

* * * * *